(12) United States Patent
Bouaziz et al.

(10) Patent No.: US 9,996,240 B2
(45) Date of Patent: Jun. 12, 2018

(54) DEVICE ASSOCIATED WITH A VEHICLE AND HAVING A SPELLING SYSTEM WITH A DELETE BUTTON AND/OR LIST SELECTION BUTTON

(71) Applicant: AUDI AG, Ingolstadt (DE)

(72) Inventors: Tahar Bouaziz, Ingolstadt (DE); Michael Betz, Ingolstadt (DE); Carolin Koeberle, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days. days.

(21) Appl. No.: 14/775,362

(22) PCT Filed: Mar. 6, 2014

(86) PCT No.: PCT/EP2014/000577
§ 371 (c)(1),
(2) Date: Sep. 11, 2015

(87) PCT Pub. No.: WO2014/139649
PCT Pub. Date: Sep. 18, 2014

(65) Prior Publication Data
US 2016/0034163 A1    Feb. 4, 2016

(30) Foreign Application Priority Data

Mar. 12, 2013    (DE) .................. 10 2013 004 244

(51) Int. Cl.
*G06F 3/0484*    (2013.01)
*G01C 21/36*    (2006.01)
(Continued)

(52) U.S. Cl.
CPC ...... *G06F 3/04847* (2013.01); *G01C 21/3611* (2013.01); *G02B 27/01* (2013.01);
(Continued)

(58) Field of Classification Search
CPC .................................................. G06F 3/04847
See application file for complete search history.

(56) References Cited

U.S. PATENT DOCUMENTS

2001/0020212 A1* 9/2001 Urban ............... G01C 21/3611
701/538
2002/0152080 A1* 10/2002 Ehrke ............... G01C 21/3611
704/276

(Continued)

FOREIGN PATENT DOCUMENTS

CN         1953082 A      4/2007
CN         101163944      4/2008

(Continued)

OTHER PUBLICATIONS

International Search Report for International Application PCT/EP2014/000577 dated Jun. 2, 2014.
(Continued)

*Primary Examiner* — Ajay M Bhatia
*Assistant Examiner* — Phoebe X Pan
(74) *Attorney, Agent, or Firm* — Alston & Bird LLP (57) ABSTRACT

The present invention relates to a vehicle-associated device, with an operating unit by means of which at least alphanumerical characters and/or symbols can be selected and assembled to form a character or function group, and with a display device by means of which, using a display unit 1, selectable characters and/or symbols can be displayed in at least one selection field 2, and selected characters, symbols, a character or function group can be displayed in at least one input field 3, wherein the device is set up (a) in order to display, on the display unit, immediately adjacent to a character or symbol dialed in by means of the operating unit and displayed in a selection field 2, a delete switch area 4 which can be activated by means of the operating unit for deleting at least the most recently selected character or (Continued)

symbol displayed in an input field 3, and/or (b) in order to display, immediately adjacently to a character or symbol dialed in by means of the operating unit and displayed in a selection field 2, a list selection switch area 5, which can be retrieved by means of the operating unit in order to retrieve a selection list.

18 Claims, 1 Drawing Sheet

(51) Int. Cl.
  *G06F 3/023*   (2006.01)
  *G02B 27/01*   (2006.01)
  *G06F 3/0482*  (2013.01)
  *G06F 17/27*   (2006.01)

(52) U.S. Cl.
  CPC .......... *G06F 3/0236* (2013.01); *G06F 3/0482* (2013.01); *G06F 3/04842* (2013.01); *G06F 17/273* (2013.01); *G06F 17/276* (2013.01)

(56) References Cited

U.S. PATENT DOCUMENTS

| | | | | |
|---|---|---|---|---|
| 2003/0114202 | A1* | 6/2003 | Suh ...................... | H04M 1/271 455/569.2 |
| 2004/0030493 | A1* | 2/2004 | Pechatnikov .......... | G01C 21/26 701/411 |
| 2006/0196925 | A1* | 9/2006 | Dong .................. | H04M 1/7258 235/375 |
| 2006/0224945 | A1* | 10/2006 | Khan .................... | G06F 3/0482 715/201 |
| 2007/0003214 | A1* | 1/2007 | Toyoda ............... | G06F 3/04847 386/344 |
| 2007/0205625 | A1* | 9/2007 | Lai ..................... | B60R 11/0264 296/70 |
| 2008/0284782 | A1* | 11/2008 | Englerth ............... | G06F 3/0236 345/468 |
| 2009/0006543 | A1* | 1/2009 | Smit .................. | G06F 17/30864 709/203 |
| 2009/0027337 | A1* | 1/2009 | Hildreth .................. | G06F 3/011 345/158 |
| 2009/0079813 | A1* | 3/2009 | Hildreth ................. | H04N 7/147 348/14.03 |
| 2009/0315740 | A1* | 12/2009 | Hildreth .................. | G06F 3/017 341/20 |
| 2009/0326794 | A1* | 12/2009 | Lungwitz ........... | G01C 21/3611 701/532 |
| 2010/0241627 | A1 | 9/2010 | Kondo et al. | |
| 2011/0304649 | A1* | 12/2011 | Schwesinger ........... | G06F 3/017 345/661 |
| 2012/0034954 | A1* | 2/2012 | Tabe ....................... | H04M 1/00 455/566 |
| 2012/0109994 | A1* | 5/2012 | Ju ........................ | G06F 17/3097 707/767 |
| 2012/0169613 | A1* | 7/2012 | Armstrong .......... | G06F 3/04886 345/173 |
| 2012/0245945 | A1* | 9/2012 | Miyauchi ................ | G10L 15/06 704/275 |
| 2013/0342460 | A1* | 12/2013 | Vincent ................. | G06F 3/0338 345/161 |
| 2014/0108004 | A1* | 4/2014 | Sternby ................. | G06F 17/242 704/9 |
| 2014/0363074 | A1* | 12/2014 | Dolfing .............. | G06K 9/00979 382/156 |
| 2015/0294145 | A1* | 10/2015 | Bouaziz ............. | G01C 21/3611 382/186 |
| 2016/0062566 | A1* | 3/2016 | Bouaziz ............. | G01C 21/3611 715/271 |
| 2016/0139796 | A1* | 5/2016 | Bouaziz ............. | G06F 3/04895 715/705 |

FOREIGN PATENT DOCUMENTS

| | | | |
|---|---|---|---|
| CN | 101164325 A | 4/2008 | |
| CN | 101855634 A | 10/2010 | |
| CN | 102939574 A | 2/2013 | |
| DE | 198 54 116 | 6/2000 | |
| DE | 199 41 949 | 3/2001 | |
| DE | 103 28 200 | 8/2007 | |
| DE | 10 2007 023313 | 11/2008 | |
| DE | 10 2007 052 613 | 5/2009 | |
| DE | 10 2009 060365 | 3/2012 | |
| EP | 1 081 582 | 3/2001 | |
| EP | 1296216 A1 * | 3/2003 | ........... G06F 3/0237 |
| EP | 1 548 551 | 6/2005 | |

OTHER PUBLICATIONS

Office Action for Chinese Application No. 201480003168.6 dated Nov. 2, 2016.
Written Opinion for International Application No. PCT/EP2014/000577 dated Nov. 2, 2016.
Office Action for Chinese Application No. 201480003168.6 dated Mar. 1, 2017.

* cited by examiner

DEVICE ASSOCIATED WITH A VEHICLE AND HAVING A SPELLING SYSTEM WITH A DELETE BUTTON AND/OR LIST SELECTION BUTTON

The present invention relates to a vehicle-associated device with speller.

In modern vehicles (motor vehicles), there are often a number of devices wherein and/or for which user inputs can be carried out. Here, not only can the devices be activated or deactivated, i.e., switched on and switched off, but it is also often possible to carry out adjustments, to make selections or to perform inputs.

Examples of such devices in vehicles are a satellite-assisted navigation system, a multimedia installation, a car phone system, or a device for Internet access that is integrated in a vehicle.

The user inputs for such devices can occur in various manners, wherein, today, entries made by means of a turn/push knob, joysticks or one or more keys probably represent the most commonly used procedure. In addition, other input possibilities are known, such as, for example, using a touchpad or touch-sensitive display unit (monitor) or by voice input. In all cases, a display of the adjustments/selections/inputs that have been made can occur on a display unit (monitor, head up display).

In the case of the above-mentioned devices, for operation, a series of characters (letters, numbers, spaces, etc.) and/or symbols can or must be selected or entered, for example, in the case of a destination input for a satellite-assisted navigation system, in the case of entering a new contact person in or in selecting a known contact person from the storage device of a car phone system, in the case of operation of a device for mobile Internet access, etc.

This always results in the need to delete already selected, input and/or displayed characters/symbols.

DE 198 54 116 A1 proposes a multifunctional operating element for motor vehicles with an alphanumerical input and display unit, wherein the input device has an at least turnable operating element, by means of which alphanumerical characters or symbols displayed on the display unit can be selected and assembled to form a character or function group. In the case of a multifunctional operating element of this type, in order to achieve an easier handling of deletion processes, it is proposed according to the invention to provide a separate delete key for deleting the respective most recently selected character or the character located in the last position.

DE 103 28 200 A1 describes a navigation apparatus for a motor vehicle, in which a trip destination can be selected on a destination site list, wherein, in a first selection step, a preselection of the destination region containing the desired destination site can be made by entering a brief designation comprising one or more letters, and the destination site can be selected in a second selection step from a list of the sites of the selected destination region. FIG. 1 of DE 103 28 200 A1 shows a first monitor display of the navigation apparatus for entering a destination region, wherein, on the monitor display, a separate delete key or a separate delete icon is represented.

EP 1 548 551 A2 proposes a device for entering alphanumerical characters, comprising a display unit on which main characters or special characters can be represented, wherein, by means of an input means, a represented alphanumerical character can be selected for input into an infotainment system, wherein the special characters are subdivided into at least two groups, wherein the special characters assembled in groups in each case are associated with a main sign. As shown in FIG. 1, the device can comprise a separate delete key.

DE 10 2007 023 313 A 1 describes a display unit and a method for operating an electronic display unit for displaying several characters of a set of characters, in particular for displaying letters and/or numbers. At least one character of the set of characters can be dialed in by activating a dialing device, and by activating a selection device for further processing. Here, the characters are arranged and displayed on a curved line. At least one of the characters can be a character for a delete function. The character for the delete function makes it possible, via its activation, to delete a character again that is located before or after the string of characters.

US 2010/0241627 proposes a device for retrieving information, which comprises an input operating unit by means of which a character can be entered by an operation performed by a user, a database which has stored a plurality of character sequences, an information extraction unit which compares a string of characters input by means of the input operation with the characters of the string of characters stored in the database, and which extracts the data of a string of characters in accordance with the character sequence input by the input operating unit from the database, and a display unit which displays the string of characters extracted by the information extraction unit, wherein the information extraction unit carries out the comparison by replacing each one of the characters in at least one string of characters entered by means of the input operating unit, and the string of characters stored in the database, with a character contained in a classified group of characters, which was established beforehand in accordance with an attribute of each sign. As indicated in FIGS. 8-10 and 12*a*-12*d*, deletion processes can be carried out by activating an "input operation unit."

The aim of the present invention is to provide a device by means of which a user, in a simple and rapid manner, can carry out the deletion of at least one already selected, input and/or displayed character and/or symbol. Another aim of the invention is to provide a device by means of which the user, in a simple and rapid manner, can carry out a selection from a selection list made available by the device.

These aims are achieved by the device according to Claim 1. Advantageous variants of the invention are the subject matter of the dependent claims and result from the description and the appended figures.

According to the invention, a vehicle-associated device is proposed, which comprises an operating unit by means of which at least alphanumerical characters and/or symbols can be selected and assembled to form a character or function group, and a display device, by means of which, using a display unit, selectable characters and/or symbols can be displayed in at least one selection field, and selected characters, symbols, and a character or function group can be displayed in at least one input field.

The device is characterized in that it is set up (a) in order to display, on the display unit, immediately adjacently to a character or symbol dialed in by means of the operating unit and displayed in a selection field, a delete switch area which can be activated by means of the operating unit for deleting at least the most recently selected character or symbol displayed in an input field, and/or (b) in order to display, immediately adjacently to a character or symbol dialed in by means of the operating unit and displayed in a selection field, a list selection switch area, which can be retrieved by means of the operating unit in order to retrieve a selection list.

From the prior art it is known that, for example, by means of an operator action on a turn/push knob, individual characters or symbols can be dialed in, for example, by turning the turn/push knob until a selection mark (for example, selection cursor, selection underlining, selection marking, selection framing) is displayed in association with the dialed in sign, or the dialed in character is displayed in a selection designation displayed in or in association with a certain position on a display unit. Subsequently, the character/symbol can be selected by an additional operator action on the turn/push knob, for example, by a pressure parallel to the rotation axis of the turn/push knob. The selected character/symbol is then displayed as a rule in an input field. Such a device is referred to as a speller.

From the prior art, various solutions are known as to how such an already selected character/symbol can be deleted again. If, for this purpose, a separate switch or a separate key is provided, then this is disadvantageous to the extent that it increases the equipment cost for the device. If a separate "delete icon" is provided, then this is disadvantageous to the extent that this "delete icon" as a rule has to be dialed in first by prolonged turning of the turn/push knob, until a character/symbol can be deleted.

These disadvantages are overcome by the present invention. Since a delete switch area is displayed in a selection field immediately adjacently to a character/symbol dialed in by means of the operating unit, the selection of the delete switch area and thus the deletion of at least one character/symbol can be carried out in each case by a rapid and simple operator action carried out on the operating unit.

Similarly, in comparison to the prior art, an advantage results with regard to the ease and rapidity of the operation, since, in a selection field, immediately adjacently to a character and/or a symbol dialed in by means of the operating unit, a list selection switch area is displayed which can be retrieved by the operating unit in order to retrieve the selection list.

According to a first advantageous embodiment of the invention, the device is set up in order to display selectable characters and/or symbols, the delete switch area and/or the list selection switch area in the at least one selection field in a single-row, linear or curved arrangement by means of the display unit.

According to a second advantageous embodiment of the invention, the device is set up in order to display a dialed in character and/or symbol and, immediately adjacently thereto, the delete switch area and/or the list selection switch area in a predeterminable, fixed position on the display unit.

It is also advantageous if the device is set up in order to display dialed in characters and/or symbols in a graphically marked manner on the display unit.

According to an additional advantageous embodiment of the invention, the device is set up (a) in order to display the delete switch area only if at least one character or symbol is already displayed in the input field and/or (b) in order to display the list selection switch area only if a selection list is generated as a function of the previously selected character(s) and/or symbols based on predeterminable criteria. As a result, a user receives immediate information on whether, on the basis of previously selected characters and/or symbols, a deletion of at least one character or symbol is possible, and/or whether a selection list is offered by the device.

Moreover, it is advantageous if the device according to the invention is set up in order to indicate, in the case of a letter/character dialed in by means of the operating unit and displayed in a selection field, that there is at least one variant with a diacritical mark for the letter/character.

Additional advantages result if the device is set up in order to assemble certain characters and/or symbols in the form of at least one group and in order to display the at least one group in the selection field in the form of a group symbol.

Advantageously, the operating unit of the device comprises at least one turn/push knob, joystick, touchpad, touch-sensitive display unit and/or device for voice input and voice detection. Here, it is possible to provide that the turn/push knob can be turned and actuated about a rotation axis and moved and/or actuated in at least one direction perpendicular to the rotation axis.

According to an additional advantageous embodiment of the invention, the device comprises a smart speller, by means of which a selected character and/or symbol, or a sequence of selected characters and/or symbols, can be compared with a stored list of possible character and/or function groups, and the device is set up in order to display, in the at least one selection field, only those characters and/or symbols which are eligible as the next character and/or symbol on the basis of the selected character(s) or symbol(s), and on the basis of the character and/or function groups which are present in the stored list.

The present invention is explained in further detail in reference to the appended drawings.

The representations in the figures are purely diagrammatic and not true to scale. Identical or similar elements are provided with identical reference numerals within the figures.

The embodiment examples explained below represent preferred embodiments of the present invention. The present invention is of course not limited to these embodiments.

Figure 1:
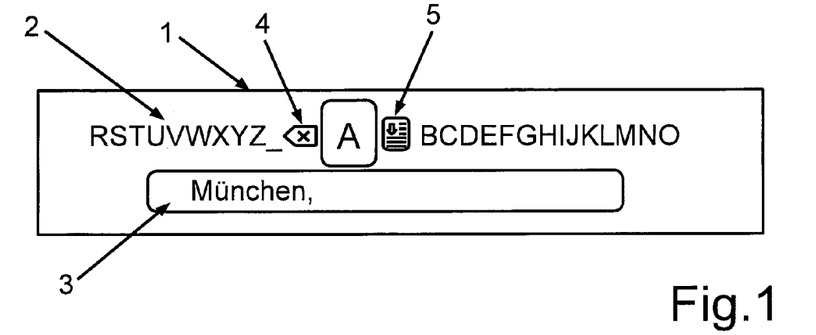
FIG. 1 shows: a first example of a display on the display unit of the device according to the invention.
Figure 2:
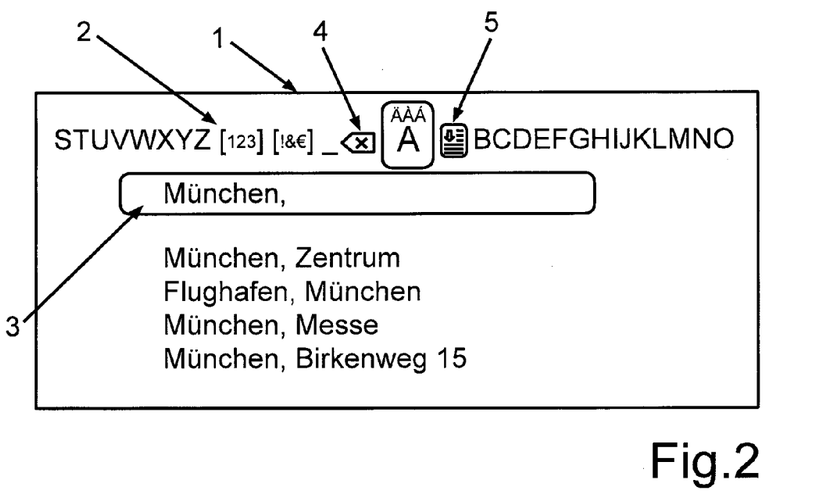
FIG. 2 shows: a second example of a display on the display unit of the device according to the invention.

In FIGS. 1 and 2, respective embodiment examples of the present invention are represented, wherein both a delete switch area 4 and also a list selection switch area 5 are displayed on the display unit 1 (for example, a monitor, a head up display). However, it is explicitly pointed out here that the present invention also comprises the embodiments in which only one of the two switch areas is displayed. The selected representation with the two switch areas is used only for a more compact and clearer representation of the invention.

As shown in FIGS. 1 and 2, the device comprises a display unit 1. On the display unit 1, selectable characters and/or symbols can be displayed in at least one selection field 2, and selected characters, symbols, a character or function group can be displayed in at least one input field 3. By means of an operating unit (not shown in the figures), characters (letters, numbers, space) and symbols (percent sign, paragraph sign, at sign, etc.) can be dialed in and subsequently selected in the selection field 2. Selected characters, symbols, a character and/or function group can be displayed in the at least one input field 3.

The arrangement of the display of the characters and symbols in the selection field 2 is not particularly limited and any suitable arrangement can be selected. For example, the characters and symbols can be displayed in a single-row, rectilinear arrangement on the display unit 1, as shown in FIGS. 1 and 2. However, the characters and symbols can also be displayed arranged on a curved line, for example, on a circular segment path or a circular path. An additional representation possibility would be, for example, the display in the form of a virtual keyboard.

By actuating the operating unit, for example, by turning a turn/push knob, by a swiping movement on a touchpad or on a touch-sensitive monitor, characters and symbols from the selection field 2 can be dialed in for a selection and transferred into the input field 3.

For this purpose, it is possible to provide either that, on the basis of an actuation of the operating unit, the characters and/or symbols displayed in the selection field 2 move relative to a predeterminable "selection position" provided on the display unit 1 at a fixed location. In the examples represented in FIGS. 1 and 2, the characters and symbols would be shown here as a result of a corresponding operator action on the operating unit one after the other by means of the "selection rectangle" marked with a larger rounded rectangle, until the character or symbol to be selected would be displayed in the "selection rectangle."

In this embodiment of the invention, the "selection rectangle" is displayed in a fixed position on the display unit 1. The same applies to the delete switch area 4 and/or the list selection switch area 5.

This embodiment has the advantage that the selection position for an observer/user is always displayed in the same position on the display unit 1, and thus he does not need to follow a "migrating" selection position with his gaze. This embodiment is also particularly advantageous in the case of the display of the characters and symbols on a circular segment path or on a circular path, since, as a result of a display of the selection position at the highest position of the circular segment path or circular path, the characters and symbols in each case have the optimal upright position for recognition/reading.

However, according to an additional embodiment of the present invention, it is also possible to provide that, based on an activation of the operating unit, a "selection position" moves relative to predeterminable characters and symbols displayed on the display unit 1 at fixed locations. Here, in principle, the characters and symbols are represented in a fixed position on the display unit 1.

Since, immediately adjacently to a dialed in character or symbol, it is provided, according to the invention, that at least one of a delete switch area 4 or of a list selection switch area 5 is displayed, it is possible, in cases where, for the display of the switch area(s), insufficient space is provided up to the next character or symbol on the display unit, to provide that, at the time of the dialing in of a character or symbol, and of the display of at least one switch area that occurs in the process according to the invention, the position of the display of the characters and symbols on the display unit 1 can be shifted by as much space as is required for the display of the respective switch area.

Furthermore, the present invention comprises a combined movement of the display of characters and symbols displayed in the display field 2 and of the "selection position." Such a combined movement can be advantageous, for example, if—as shown in FIGS. 1 and 2—insufficient space is available on the display unit 1 for the display of all the selectable characters and symbols.

In the case of such a position, it is possible that, as a result of the activation of the operating unit, for example, the selection position can "migrate" over the display unit 1 until it is displayed at a margin of the display unit 1. In case of further activation of the operating unit, it is possible to provide then for the continued display of the selection position at the margin of the display unit 1, but now only the characters and symbols "migrate" relative to the selection position.

In the cases in which, as a result of an activation of the operating unit, the selection position migrates over the display unit 1, it is possible to provide that the delete switch area 4 and/or the list selection switch area 5 is/are displayed only after the selection position has been next to a character or symbol for a predetermined time, for example, 1 s, 2 s or 3 s.

To the extent that, in the present application, the expression "immediately adjacently" is used, it means that no additional character or symbol is displayed between the delete switch area 4 and/or the list selection switch area 5 and the dialed in character or symbol. However, graphic elements such as, for example, a thin line, can be displayed between the dialed in character or symbol and the switch area(s).

In principle, the delete switch area 4 and/or the list selection switch area 5 can be arranged in any suitable position immediately adjacently to the dialed in character or symbol, that is to say immediately to the left, to the right, above or beneath the character or symbol, for example.

The position of the display of the selection field 2 on the display unit 1 is not particularly limited and any suitable position can be selected. With a view to the most efficient possible use of the space that is available (display area of the display unit 1) and to the logical sequence of the individual operating steps on the device (first dialing in, then selection, then display of the selected character or symbol in the display field 3), a horizontal display of the characters and symbols that can be dialed in and selected above the input field 3 is preferable.

A thin line—as mentioned above and shown in FIGS. 1 and 2—is an example of how a selected character and/or symbol can be displayed in a graphically marked manner on the display unit 1. However, the present invention is not limited thereto. For example, a dialed in character and/or symbol can also be displayed in an enlarged representation ("magnifying glass function"), in another color, in another format (for example, cursive script, bold print, underlined), etc., in comparison to the additional characters and/or symbol that can be dialed in.

According to an advantageous variant of the invention, it is provided that the device is set up in order to display the delete switch area 4 only when at least one character or symbol has already been displayed in the input field 3. This is advantageous in that a deletion of a character or symbol is anyway only possible in cases in which at least one character or symbol is present in the input field 3.

According to a further advantageous embodiment of the invention, it is provided that the device is set up in order to display the list selection switch area 5 only if a selection list is generated as a function of the previously selected characters and/or symbol(s) based on predeterminable criteria.

Many vehicle-associated devices, wherein selected characters, symbols, a character or function group can be displayed in at least one input field 3, such as, for example, a satellite-assisted navigation system, have a database structure with entries contained therein. It is also known that, in the case of a selection of at least one character or symbol, in these devices, a comparison can be carried out in order to determine whether, for selected character or symbol, there is an agreement with the entries in the database. If this is the case, the entries that are in agreement can be offered or displayed to a user by way of a selection list, and the user can make a selection from the selection list displayed.

However, here it is useful to indicate criteria as to when a selection list is to be set up and offered/displayed in the case of existing agreements. For example, if a user has selected only one character/symbol, there may be many agreements with this character/symbol; for example, if a user selects only the letter "E" and the database contains more than 100 words (character or function groups) containing the letter "E." In such a case, it is possible to provide that no selection list is generated, since the display of, and a selection from, such a selection list does not seem useful for a user.

In such a case it is possible, for example, to use the requirement that the selection list must not contain more than 10, 15 or 20 list entries, as criterion for the generation of a selection list.

In order to avoid an "unsteady display" resulting from the inclusion and exclusion of delete switch area 4 and/or list selection switch area 5, it is possible to optionally provide for designing the display of delete switch area 4 and/or list selection switch area 4 differently, depending on whether or not it is possible to dial in by means of the switch area(s). For example, a switch area could be displayed in a way so it is more difficult to see (darker or lower-contrast display) when it is not possible to dial in using this area.

Moreover, the device according to the invention can be set up in order to display, next to a letter/character that has been dialed in by means of the operating unit and displayed in a selection field 2, that there is at least one variant with a diacritical mark for the letter/character.

An example of such a display is represented in FIG. 2. For example, if, due to the language selected for the device, for a given letter (here: A), an umlaut (here: Ä) or variants using an accent (here: Á and À) exist, this circumstance can be displayed according to the invention. In the example represented in FIG. 2, a display of the variants that is reduced in size in comparison to the selected letter/character has been selected to be above the letter/character. However, the manner of displaying the fact that variants exist for the letter/character is not limited to this type of display and it can be of any other suitable type.

For example, the variants can be retrieved by way of a special manner of operating the operating unit and subsequently at least one of the variants can be selected.

For example, in the case of a letter for which at least one variant with a diacritical marks exists, the character expansion can be activated by a long push/long press on the letter within the character/symbol band. The display of the character/symbol band is then expanded with the respective characters associated with the letter. After the selection of any of these characters, for example, by another long push/long press on the sign, the display of the character/symbol band is again reduced to the basic characters.

As already mentioned above, in many cases there is not enough space available on the display unit 1 for a sufficiently large display of all the characters and/or symbols, so that a selection requires a "scrolling in" of characters and/or symbols not displayed initially on the display unit 1 and a "scrolling out" of characters and/or symbols displayed initially on the display unit 1 (for example, an expandable character/symbol band).

Here, the character/symbol band can have a beginning stop position and an end stop position, for example, a beginning stop position at the letter "A" and an end stop position at the number "9." In order to be able to move from such a beginning or end stop position in a time-saving manner to the respective other end of the character/symbol band, a cursor jump can be provided. If one scrolls to the respective beginning or the end of the character/symbol band, for example, the cursor is briefly caught and stopped; after scrolling again in the same direction as before, the cursor can then be animated out of the visible area, for example, by a "wrap around animation," and be displayed again on the other side of the character/symbol band.

In many cases scrolling in and scrolling out can be reduced or even avoided if certain characters and/or symbols are assembled in the form of at least one group and displayed in the form of a group symbol in the selection field 2.

As shown in FIG. 2, a first group can comprise, for example, the numbers 0 to 9, and a second group can comprise a number of symbols (!, &, ϵ, %, §, *, etc.). A suitable group symbol should be selected for the display of a group, i.e., a display by means of which it is as easy as possible for a user to recognize which elements are contained in the group (in the example depicted in FIG. 2 "[123]" for the group of the numbers 0 to 9, and "[!&ϵ]" for the group of the symbols that can be dialed in and selected). A group can also be retrieved by way of a special manner of operating the operating unit, and subsequently at least one element of the group can be selected. In this regard, it is possible to provide, for example, the same operator actions as were described above in reference to the character expansion based on diacritical marks.

The operating unit provided in the case of the device according to the invention is not particularly limited, and any suitable operating unit can be provided. The operating unit comprises, for example, at least one turn/push knob, joystick, touchpad, touch-sensitive display unit and/or device for voice input and voice recognition. One or more identical operating units or a combination of different operating units can be provided at the same time. If the operating unit is a touch-sensitive display unit, the operating unit and display unit 1 of the device can be identical.

As a preferred example of an operating unit of the device according to the invention, a turn/push knob is mentioned, which can be turned and actuated about a rotation axis and which can be moved and actuated in at least one direction perpendicular to the rotation axis. Such an operating unit is also commonly referred to as a "joystick."

By means of such a "joystick," it is possible, for example, to dial in a character or symbol by turning about a rotation axis and to select the dialed in character or symbol by a pressure applied parallel to the rotation axis. Or, by turning about the rotation axis, the delete switch area 4 can be dialed in, and, by applying a pressure parallel to the rotation axis, at least the most recently selected character or symbol can be deleted from the input field 3.

And by moving the "joystick" perpendicularly to the rotation axis, for example, in the direction of the console, it is possible, for example, to display selectable variants of a letter/character. And, by moving the "joystick" perpendicularly to the rotation axis, for example, in the direction away from the console, it is possible, for example, to provide that a direct access to the selection list is opened.

The device according to the invention can also comprise a so-called "smart speller." By means of such a "smart speller," a selected character or symbol or a sequence of selected characters and/or symbols can be compared with a stored list of possible character and/or function groups. If the result of such a comparison is that, for the given device and based on the selected character(s) and/or symbol(s), only certain additional entries remain eligible, it is advantageous to be able now to display only those characters and/or symbols in the at least one selection field 2, which are eligible as the next character and/or symbol, based on the selected character(s) or symbol(s), and on the character and/or function groups present in the stored list.

Here, at least one selection criterion can be provided for the "eligibility", for example, that an agreement must exist between the selected character or symbol or a sequence of selected characters and/or symbols and a character or symbol or a sequence of characters and/or symbols within at least one data element among the data present in the storage device. For example, if such an agreement exists with regard to several data elements (for example, location names, street names, first names, last names, telephone numbers, email addresses, etc.), then the smart speller displays only the characters and/or symbols in the selection field that are required to complete the data elements which are eligible.

As a result, it is made easier for the user to select the next character(s) or symbol(s) and the risk of an incorrect dial in and/or an incorrect selection is reduced.

On the display unit 1 of the device according to the invention, additional elements can naturally be displayed, such as, for example, an instruction or assistance text, an icon which, when selected, makes it possible to configure options of the device, elements of a selection list that is available (as shown in FIG. 2, for example), etc. These elements can also be activated by corresponding operator actions.

The examples represented in FIGS. 1 and 2 relate to a navigation system. The present invention is naturally not limited to the use in a navigation system but can instead be used for all types of vehicle-associated devices in which the dialing in and selecting of characters and/or symbols and the deletion of characters and/or symbols and/or the retrieval of and selection from selection lists occurs or can occur, such as, for example, a multimedia installation, a car phone system or a vehicle-integrated device for Internet access.

Since it is known to a person skilled in the art how the device according to the invention, the display device with the display unit 1 (monitor, head up display) can be constructed, and how the components of the device must interact with one another so that the device according to the invention has the properties described in the present application, no further details in that regard are needed in the present case.

By the present invention, a user of the device according to the invention is provided with an optimal possibility for deleting already selected or displayed characters or symbols. The same applies to the access to a selection list provided by the device.

This results in an optimal support for the user. In addition, the duration and the attention that a user needs for the selection/input process are reduced, as a result of which undesired distraction of the driver from road traffic, in the sense of traffic safety, is minimized.

The invention claimed is:

1. A vehicle-integrated device, comprising:
   an operating unit configured for which at least alphanumerical characters or symbols are selected and assembled to form a character or function group, wherein the operating unit is at least one of a turn or push knob or a joystick; and
   a display device configured for which, using a display unit (1), selectable characters or symbols are displayed in at least one selection field (2), and selected characters, symbols, a character or function group can be displayed in at least one input field (3), characterized in that the display device is set up:

(a) in order to display, on the display unit, immediately adjacently to a character or symbol dialed in by means of the operating unit and displayed in the at least one selection field (2), a delete switch area (4) which can be activated by means of the operating unit for deleting at least the most recently selected character or symbol displayed in the at least one input field (3), and
   (b) in order to display, on the display unit, immediately adjacently to any character or symbol dialed in by means of the operating unit and displayed in the at least one selection field (2), a list selection switch area (5), which can be retrieved by means of the operating unit in order to retrieve a selection list generated as a function of previously selected characters or symbols in the at least one input field (3) based on predetermined criteria,
   characterized in that the display device is set up in order to display selectable characters or symbols, the delete switch area (4) and the list selection switch area (5) in the at least one selection field (2) in a single-row, linear or curved arrangement, by means of the display unit (1),
   wherein the delete switch area (4) and the list selection switch area (5) are displayed between a first character or symbol dialed in and at least one other selectable character or symbol in the at least one selection field (2) in response to the first character or symbol being dialed in,
   in response to the first character or symbol dialed in being selected by the operating unit display the first character or symbol in the at least one input field;
   in response to the list selection switch area (5) being selected by the operating unit, display the selection list generated as a function of the previously selected characters or symbols;
   in response to the delete switch area (4) being selected by the operating unit, delete the first character or symbol displayed in the at least one input field; and
   in response to a second character or symbol being dialed in, the delete switch area (4) and the list selection switch area (5) are displayed between the second character or symbol dialed in and at least one other selectable character or symbol in the at least one selection field (2).

2. The vehicle-integrated device according to claim 1, characterized in that the display device is set up in order to display a dialed in character or symbol and, immediately adjacently thereto, the delete switch area (4) or the list selection switch area (5) in a predeterminable fixed position on the display unit (1).

3. The vehicle-integrated device according to claim 1, characterized in that the display device is set up in order to display a dialed in character or symbol in a graphically marked manner on the display unit (1).

4. The vehicle-integrated device according to claim 1, characterized in that the display device is set up
   (a) in order to display the delete switch area (4) only if at least one character or symbol is already displayed in the at least one input field (3), or
   (b) in order to display the list selection switch area (5) only if the selection list has been generated depending on the previously selected character(s) or symbol(s) based on predeterminable criteria.

5. The vehicle-integrated device according to claim 1, characterized in that the display device is set up in order to display, in the case of a character dialed in by the operating unit and displayed in the at least one selection field (2), that there is at least one variant with diacritical mark for the character.

6. The vehicle-integrated device according to claim 1, characterized in that the vehicle-integrated device is set up in order to assemble certain characters or symbols in the form of at least one group and in order to display the at least one group in the at least one selection field (2) in the form of a group symbol.

7. The vehicle-integrated device according to claim 1, characterized in that the turn or push knob can be turned and actuated about a rotation axis and moved and actuated in at least one direction perpendicular to the rotation axis.

8. The vehicle-integrated device according to claim 1, characterized in that
   it comprises a smart speller configured for which a selected character or symbol or a sequence of selected characters or symbols can be compared with a stored list of possible character or function groups, and
   the display device is set up in order to display, in the at least one selection field (2), only those characters or symbols which are eligible as the next character or symbol, on the basis of the selected character(s) or symbol(s) and of the character or symbol groups which are present in the stored list.

9. The vehicle-integrated device of claim 1, wherein the selectable characters or symbols are moved in response to a user input along the at least one selection field (2) while the delete switch area (4) or the list selection switch area (5) remains stationary.

10. A method comprising:
   displaying a user interface in a vehicle-integrated device, through the user interface alphanumerical characters or symbols are selected and assembled to form a character or function group, wherein an operating unit used for user input in a vehicle-integrated device is at least one of a turn or push knob, or a joystick;
   in the user interface:
      providing for display of a selection field (2), wherein the selection field (2) comprises a plurality of characters or symbols, a delete switch area (4), and a list selection switch area (5) in a single-row, linear or curved arrangement;
      providing for display of an input field where selected characters, symbols, a character or function group are displayed;
      visually distinguishing a character or symbol from among the plurality of characters or symbols in the selection field (2) as the dialed in character or symbol;
      providing for display of the delete switch area (4) and the list selection switch area (5) immediately adjacent to the dialed in character or symbol regardless of which character or symbol is dialed in, between the dialed in character or symbol and at least one other character or symbol of the plurality of characters or symbols in the selection field (2);
      wherein the delete switch area (4) can be activated by means of the operating unit for deleting at least the most recently selected character or symbol displayed in the input field (3), and the list selection switch area (5) can be activated by means of the operating unit in order to retrieve a selection list generated as a function of previously selected characters or symbols displayed in the input field (3) based on predetermined criteria;
      in response to a first dialed in character or symbol in the selection field (2) being selected by the operating unit providing for display of the first character or symbol in the input field;
      in response to the list selection switch area (5) being selected by the operating unit, providing for display of the selection list generated as a function of the previously selected characters or symbols;
      in response to the delete switch area (4) being selected by the operating unit, causing deletion of the first character or symbol displayed in the input field; and
      in response to a second character or symbol in the selection field (2) being dialed in, providing for display of the delete switch area (4) and the list selection switch area (5) between the second character or symbol dialed in and at least one other selectable character or symbol in the selection field (2).

11. The method of claim 10, wherein the delete switch area a1 is provided for display in response to one or more characters or symbols being entered in the input field.

12. The method of claim 10, wherein the list selection switch area (5) is provided for display in response to the selection list being generated as a function of previously selected characters or symbols.

13. The method of claim 10, wherein visually distinguishing the character or symbol from among the plurality of characters or symbols as the dialed in character or symbol comprises providing for display of at least one variant with a diacritical mark for the dialed in character or symbol.

14. The method of claim 10, wherein visually distinguishing a character or symbol from among the plurality of characters or symbols as the dialed in character or symbol comprises providing for display of a border around the dialed in character or symbol, wherein the border remains in a fixed position on a display, and wherein changing the dialed in character or symbol comprises scrolling the plurality of characters or symbols through the border.

15. A vehicle-integrated device comprising:
   a user interface through which alphanumerical characters or symbols are selected and assembled to form a character or function group, wherein an operating unit used for user input is at least one of a turn or push knob, or a joystick; and
   a display, wherein selectable characters or symbols, a delete switch area (4), and a list selection switch area (5) are displayed on the display in a single-row, linear or curved, in at least one selection field (2), and selected characters, symbols, a character or function group can be displayed in at least one input field (3) of the display, wherein:
      the delete switch area (4) is provided for display on the display immediately adjacently to a character or symbol dialed in using the user interface and displayed in the at least one selection field (2), the delete switch area (4) operable via the user interface for deleting at least the most recently selected character or symbol displayed in the at least one input field (3), and
      the list selection switch area (5) is provided for display immediately adjacent to any character or symbol dialed in using the user interface and displayed in the at least one selection field (2), the list selection switch area (5) operable to retrieve a selection list associated with the selected character, symbol or function group and generated as a function of previously selected characters or symbols based on predetermined criteria, wherein the delete switch area (4) and the list selection switch area (5) are displayed between a first character or symbol dialed in and at least one other selectable character or symbol in the at least one selection field (2);

in response to the first character or symbol dialed in being selected by the operating unit, display the first character or symbol in the at least one input field;

in response to the list selection switch area (5) being selected by the operating unit, display the selection list generated as a function of the previously selected characters or symbols;

in response to the delete switch area (4) being selected by the operating unit, delete the first character or symbol displayed in the at least one input field;

in response to a second character or symbol being dialed in, the delete switch area (4) and the list selection switch area (5) are displayed between the second character or symbol dialed in and at least one other selectable character or symbol in the at least one selection field.

16. The vehicle-integrated device of claim 15, wherein the dialed in character or symbol is provided for display immediately adjacent to the delete switch area (4) or the list selection switch area (5) in a predetermined fixed position on the display.

17. The vehicle-integrated device of claim 15, wherein:

the delete switch area (4) is provided for display in response to at least one character or symbol having been selected and displayed in the at least one input field, and the list selection switch area (5) is provided for display in response to the selected characters, symbols, or function group satisfying a predetermined criteria.

18. The vehicle-integrated device of claim 15, wherein at least one variant of a character including a diacritical mark for the character is provided for display in the selection field (2) in response to the character being dialed in.

* * * * *

UNITED STATES PATENT AND TRADEMARK OFFICE
CERTIFICATE OF CORRECTION

PATENT NO. : 9,996,240 B2  
APPLICATION NO. : 14/775362  
DATED : June 12, 2018  
INVENTOR(S) : Bouaziz et al.

Page 1 of 1

It is certified that error appears in the above-identified patent and that said Letters Patent is hereby corrected as shown below:

In the Claims

Column 12,
Line 19, "area al" should read --area (4)--.

Signed and Sealed this
Second Day of October, 2018

Andrei Iancu
*Director of the United States Patent and Trademark Office*